(12) United States Patent
Cooper et al.

(10) Patent No.: US 8,217,108 B2
(45) Date of Patent: Jul. 10, 2012

(54) POLYMERIC COMPOSITE INCLUDING NANOPARTICLE FILLER

(75) Inventors: Sarah M. Cooper, Santa Clara, CA (US); Cathy Fleischer, Rochester, NY (US); Michael Duffy, Rochester, NY (US); Aaron Wagner, Rochester, NY (US)

(73) Assignee: NaturalNano, Inc., Pittsford, NY (US)

( * ) Notice: Subject to any disclaimer, the term of this patent is extended or adjusted under 35 U.S.C. 154(b) by 0 days.

(21) Appl. No.: 12/987,594

(22) Filed: Jan. 10, 2011

(65) Prior Publication Data

US 2011/0160345 A1  Jun. 30, 2011

Related U.S. Application Data

(62) Division of application No. 11/469,128, filed on Aug. 31, 2006, now Pat. No. 7,888,419.

(60) Provisional application No. 60/713,362, filed on Sep. 2, 2005, provisional application No. 60/728,939, filed on Oct. 22, 2005.

(51) Int. Cl.
 *C08K 9/04* (2006.01)
(52) U.S. Cl. ........................ 524/445; 524/451
(58) Field of Classification Search .................. 524/445, 524/451
See application file for complete search history.

(56) References Cited

U.S. PATENT DOCUMENTS

| | | | |
|---|---|---|---|
| 3,059,379 A | 10/1962 | Attoe |
| 3,488,166 A | 1/1970 | Kovak et al. |
| 3,616,973 A | 11/1971 | Hartley |
| 3,833,534 A | 9/1974 | Tierney et al. |
| 3,971,749 A | 7/1976 | Blunt |
| 4,019,934 A | 4/1977 | Takayama |
| 4,150,099 A | 4/1979 | Robson |
| 4,364,857 A | 12/1982 | Santilli |
| 4,434,075 A | 2/1984 | Mardis et al. |
| 4,582,866 A | 4/1986 | Shain |
| 4,591,485 A | 5/1986 | Olsen et al. |
| 4,871,536 A | 10/1989 | Arraudeau |
| 4,877,501 A | 10/1989 | Schnur et al. |
| 4,887,622 A | 12/1989 | Gueret |
| 4,889,885 A | 12/1989 | Usuki et al. |
| 4,894,411 A | 1/1990 | Okada et al. |
| 4,911,981 A | 3/1990 | Schnur et al. |
| 5,039,338 A | 8/1991 | Kondo et al. |
| 5,049,382 A | 9/1991 | Price et al. |
| 5,133,590 A | 7/1992 | Fitjer |
| 5,284,683 A | 2/1994 | Erhan |
| 5,330,552 A | 7/1994 | Rizzo |
| 5,385,776 A | 1/1995 | Maxfield et al. |
| 5,462,798 A | 10/1995 | Gueret |
| 5,492,696 A | 2/1996 | Price et al. |
| 5,514,734 A | 5/1996 | Maxfield et al. |
| 5,618,523 A | 4/1997 | Zysman |
| 5,651,976 A | 7/1997 | Price et al. |
| 5,705,191 A | 1/1998 | Price |
| 5,718,841 A | 2/1998 | Mardis et al. |
| 5,744,337 A | 4/1998 | Price et al. |
| 5,747,560 A | 5/1998 | Christiani et al. |
| 5,780,376 A | 7/1998 | Gonzales et al. |
| 5,855,818 A | 1/1999 | Gan et al. |
| 5,952,093 A | 9/1999 | Nichols et al. |
| 5,980,871 A | 11/1999 | Lukenbach |
| 6,013,206 A | 1/2000 | Price et al. |
| 6,015,574 A | 1/2000 | Cannell |
| 6,034,163 A | 3/2000 | Barbee et al. |
| 6,036,765 A | 3/2000 | Farrow et al. |
| 6,221,389 B1 | 4/2001 | Cannell |
| 6,280,759 B1 | 8/2001 | Price et al. |
| 6,401,816 B1 | 6/2002 | Price |
| 6,414,070 B1 | 7/2002 | Kausch et al. |
| 6,420,293 B1 | 7/2002 | Chang et al. |
| 6,437,050 B1 | 8/2002 | Krom et al. |
| 6,475,696 B2 | 11/2002 | Majumdar et al. |
| 6,518,324 B1 | 2/2003 | Kresta et al. |
| 6,548,159 B2 | 4/2003 | Tsai et al. |
| 6,822,032 B2 | 11/2004 | Gallucci |
| 6,838,508 B2 | 1/2005 | Hsiao et al. |
| 6,919,063 B2 | 7/2005 | Jang et al. |
| 6,958,860 B2 | 10/2005 | Dontula et al. |
| 7,046,439 B2 | 5/2006 | Kaminsky et al. |
| 7,068,898 B2 | 6/2006 | Buretea et al. |

(Continued)

FOREIGN PATENT DOCUMENTS

CN 1673200 9/2005

(Continued)

OTHER PUBLICATIONS

International Search Report and Written Opinion dated Aug. 1, 2008 for PCT/US2008/059017, (published as WO 2008/124391) which corresponds to U.S. Appl. No. 11/697,510.

(Continued)

*Primary Examiner* — Robert D. Harlan
(74) *Attorney, Agent, or Firm* — Duane C. Basch; Basch & Nickerson LLP (57) ABSTRACT

Disclosed is a novel polymeric composite including a nanoparticle filler and method for the production thereof. More particularly, the present invention provides a novel halloysite nanoparticle filler which has the generally cylindrical or tubular (e.g. rolled scroll-like shape), in which the mean outer diameter of the filler particle is typically less than about 500 nm. The filler is effectively employed in a polymer composite in which the advantages of the tubular nanoparticle filler are provided (e.g., reinforcement, flame retardant, chemical agent elution, etc.) with improved or equivalent mechanical performance of the composite (e.g., strength and ductility).

24 Claims, 1 Drawing Sheet

U.S. PATENT DOCUMENTS

| | | | |
|---|---|---|---|
| 7,078,452 | B2 | 7/2006 | Ebrahimian et al. |
| 7,115,282 | B2 | 10/2006 | Shefer et al. |
| 7,135,508 | B2 | 11/2006 | Chaiko et al. |
| 7,400,490 | B2 | 7/2008 | Gunderman et al. |
| 7,679,883 | B2 | 3/2010 | Gunderman et al. |
| 7,888,419 | B2 | 2/2011 | Cooper et al. |
| 2001/0026802 | A1 | 10/2001 | Price et al. |
| 2002/0110686 | A1 | 8/2002 | Dugan |
| 2002/0142022 | A1 | 10/2002 | Price et al. |
| 2002/0151634 | A1 | 10/2002 | Rohrbaugh |
| 2002/0156171 | A1 | 10/2002 | Drewnick et al. |
| 2002/0160159 | A1 | 10/2002 | McDonald |
| 2002/0168509 | A1 | 11/2002 | DeSimone et al. |
| 2003/0039750 | A1 | 2/2003 | Mao et al. |
| 2003/0085132 | A1 | 5/2003 | Cobley et al. |
| 2003/0087103 | A1 | 5/2003 | Belmares et al. |
| 2003/0099798 | A1 | 5/2003 | George et al. |
| 2003/0100653 | A1 | 5/2003 | Chacko |
| 2003/0100654 | A1 | 5/2003 | Chheang et al. |
| 2003/0191213 | A1 | 10/2003 | Troutman et al. |
| 2003/0205072 | A1 | 11/2003 | Van Der Merwe |
| 2004/0013597 | A1 | 1/2004 | Mao et al. |
| 2004/0030020 | A1 | 2/2004 | Liang et al. |
| 2004/0040834 | A1 | 3/2004 | Smalley et al. |
| 2004/0052957 | A1 | 3/2004 | Cramer et al. |
| 2004/0074778 | A1 | 4/2004 | Cobley et al. |
| 2004/0086656 | A1 | 5/2004 | Kohl et al. |
| 2004/0141932 | A2 | 7/2004 | Kanji |
| 2005/0032959 | A1 | 2/2005 | Cheung et al. |
| 2005/0038173 | A1 | 2/2005 | Harris et al. |
| 2005/0165151 | A1 | 7/2005 | Fujiwara et al. |
| 2005/0171265 | A1 * | 8/2005 | Bortnick et al. ............. 524/445 |
| 2005/0227074 | A1 | 10/2005 | Oyamada et al. |
| 2005/0272846 | A1 | 12/2005 | Price et al. |
| 2006/0035087 | A1 | 2/2006 | Yadav et al. |
| 2006/0062840 | A1 | 3/2006 | Price et al. |
| 2006/0065537 | A1 | 3/2006 | Barstad et al. |
| 2006/0073335 | A1 | 4/2006 | Oyamada et al. |
| 2006/0089444 | A1 | 4/2006 | Goodman et al. |
| 2006/0102871 | A1 | 5/2006 | Wang et al. |
| 2006/0134362 | A1 | 6/2006 | Lu et al. |
| 2006/0142455 | A1 | 6/2006 | Agarwal et al. |
| 2006/0155012 | A1 | 7/2006 | Riebel |
| 2006/0163160 | A1 | 7/2006 | Weiner et al. |
| 2006/0165926 | A1 | 7/2006 | Weber |
| 2006/0166810 | A1 | 7/2006 | Gunderman et al. |
| 2006/0183328 | A1 | 8/2006 | Barstad et al. |
| 2006/0193978 | A1 | 8/2006 | Toth |
| 2006/0196764 | A1 | 9/2006 | Schoen et al. |
| 2006/0240251 | A1 | 10/2006 | Lunsford et al. |
| 2006/0247332 | A1 | 11/2006 | Coffey et al. |
| 2006/0293430 | A1 | 12/2006 | Wang et al. |
| 2007/0106006 | A1 | 5/2007 | Cooper et al. |
| 2007/0148457 | A1 | 6/2007 | Wagner et al. |
| 2007/0227351 | A1 | 10/2007 | Garcia-Martinez |
| 2007/0292459 | A1 | 12/2007 | Cooper et al. |
| 2008/0194406 | A1 | 8/2008 | Price et al. |
| 2008/0248201 | A1 | 10/2008 | Corkery et al. |
| 2008/0249221 | A1 | 10/2008 | Corkery et al. |
| 2008/0262126 | A1 | 10/2008 | Fleischer et al. |
| 2009/0005489 | A1 | 1/2009 | Daly et al. |
| 2009/0326133 | A1 | 12/2009 | Daly et al. |
| 2010/0171081 | A1 | 7/2010 | Gunderman et al. |
| 2011/0086956 | A1 | 4/2011 | Boscia et al. |

FOREIGN PATENT DOCUMENTS

| | | |
|---|---|---|
| CN | 1746216 | 3/2006 |
| JP | 2000297179 | 10/2000 |
| WO | WO9848623 | 11/1998 |
| WO | WO2004106420 | 12/2004 |
| WO | WO2006127572 | 11/2006 |
| WO | WO2007011586 | 1/2007 |
| WO | WO2007048018 | 4/2007 |
| WO | WO2007142663 | 12/2007 |
| WO | WO2008045028 | 4/2008 |
| WO | WO2008104851 | 9/2008 |
| WO | WO2008112362 | 9/2008 |
| WO | WO2008124389 | 10/2008 |
| WO | WO2008124391 | 10/2008 |
| WO | WO2009002994 | 12/2008 |
| WO | WO2009029310 | 3/2009 |
| WO | WO2010056689 | 5/2010 |

OTHER PUBLICATIONS

International Search Report and Written Opinion dated Feb. 7, 2008 for PCT/US2008/053270 (WO 2008/112362) which corresponds to U.S. Appl. No. 12/027,402.

International Search Report and Written Opinion dated Apr. 2, 2008 for PCT/US2006/034281 (published as WO 2007/142663) which corresponds to U.S. Appl. No. 11/469,128.

International Search Report and Written Opinion dated Aug. 7, 2008 for PCT/US2008/059009 (published as WO 2008/124389) which corresponds to U.S. Appl. No. 11/697,490.

International Search Report and Written Opinion dated Jan. 30, 2009 for PCT/US2008/064640 (published as WO 2009/029310) which corresponds to U.S. Appl. No. 12/126,035.

International Search Report and Written Opinion dated Jul. 23, 2008 for PCT/US2006/035659 (published as WO 2008/124389) which corresponds to U.S. Appl. No. 11/531,459.

International Search Report and Written Opinion dated Jun. 25, 2009 for PCT/US2008/068095 (published as WO 2009/002994) which corresponds to U.S. Appl. No. 12/145,525.

International Search Report and Written Opinion dated Mar. 4, 2010 for PCT/US2009/063950 filed Nov. 11, 2009 (published as WO 2010/056689).

International Search Report and Written Opinion dated May 7, 2007 for PCT/US2006/041208 (published as WO/2007/048018 A2) which corresponds to U.S. Appl. No. 11/551,115.

File History for U.S. Appl. No. 60/713,362, filed Sep. 2, 2005; Inventors Cooper et al.

File History for U.S. Appl. No. 60/717,533, filed Sep. 14, 2005; Inventors Weiner et al.

File History for U.S. Appl. No. 60/728,939, filed Oct. 22, 2005; Inventors Weiner et al.

File History for U.S. Appl. No. 60/867,369, filed Jan. 27, 2006; Inventors Boscia et al.

File History for U.S. Appl. No. 60/888,685, filed Feb. 7, 2007; Inventors Fleischer et al.

Prosecution History as of Feb. 9, 2011 for U.S. Appl. No. 11/469,128, filed Aug. 31, 2006; published May 10, 2007 as US-2007-0106006-A1; issued Feb. 15, 2011 as US 7,888,419; Inventors Cooper et al.

Prosecution History as of Feb. 9, 2011 for U.S. Appl. No. 11/697,510, filed Apr. 6, 2007; published Oct. 9, 2008 as US-2008-0248201-A1; Inventors Corkery et al.

Prosecution History as of Mar. 23, 2011 for U.S. Appl. No. 11/697,490, filed Apr. 6, 2007; published Oct. 9, 2008 as US-2008-0249221-A1; Inventors Corkery et al.

Prosecution History as of Mar. 23, 2011 for U.S. Appl. No. 11/551,115, filed Oct. 19, 2006; published Aug. 14, 2006 as US-2008-0194406-A1; Inventors Price et al.

Prosecution History as of Apr. 11, 2011 for U.S. Appl. No. 11/945,413, filed Nov. 27, 2007; Inventors Boscia et al.

Prosecution History as of Mar. 23, 2011 for U.S. Appl. No. 12/027,402, filed Feb. 7, 2008; published Oct. 23, 2008 as US-2008-0262126-A1; Inventors Fleischer et al.

Prosecution History as of Mar. 23, 2011 for U.S. Appl. No. 12/126,035, filed May 23, 2008; published Dec. 31, 2009 as US-2009-0326133-A1; Inventors Daly et al.

Prosecution History as of Sep. 28, 2010 for U.S. Appl. No. 11/531,459, filed Sep. 13, 2006; published Jun. 28, 2007 as US-2007-0148457-A1; Inventors Wagner et al.

Prosecution History as of Sep. 28, 2010 for U.S. Appl. No. 11/042,219, filed Jan. 25, 2005; published Jul. 26, 2006 as US 2006-0163160 A1;Inventors Weiner et al.

Prosecution History of US Patent 7,400,490 as of Sep. 28, 2010.

Arkles; B. Arkles; Silane Coupling Agents: Connecting Across Boundaries; V2.0, copyright 2006.

Ash, B. et al.; Investigation into the Thermal and Mechanical Behavior of PMMA/Alumina Nanocomposites; Materials Research Society Symposium Proceedings, vol. 661, p. KK2 10.1-6 (2001).

Baral et al. 'Electroless Metalization of Halloysite, a Hollow Cylindrical 1:1 Aluminosilicate of Submicron Diameter.' In; Chem. Mater., 1993, vol. 5, No. 9, pp. 1227-1232.

Bergman, J.; Chen, H.; Giannelis, P.; Thomas, M., Coates, G.; Synthesis and characterization of polyolefin-silicate nanocomposites: a catalyst intercalation and in situpolymerization approach; Cornell University, Ithaca, NY 14853, US; Chem. Commun., 1999, 2179-2180.

Birnbaum et al.; Linda S. Birnbaum and Daniele F. Staskal; Brominated Flame Retardants: Cause for Concern?; Environmental Health Perspectives, 112: 9-17 (2004).

CN1273200 Li; Abstract of CN1673200 published Sep. 28, 2005; application CN200510333316 Mar. 2, 2005 Inventors Li et al.

CN1746216 CAPlus Abstract / Machine Translation of CN1746216; published Mar. 15, 2006; Inventor Guo; Applicant Huanan Science & Engineering (CN).

Du et al.; Preparation and Characterization of Polypropylene Grafted Halloysite and Their Compatibility Effect to Polypropylene/Halloysite Composite; Polymer Journal, vol. 38, No. 11, pp. 1198-1204 (2006) The Society of Polymer Science, Japan.

Du, M. et al., Thermal Stability and Flame Retardant Effects of Halloysite Nanotubes on Poly(propylene); published in the European Polymer Journal, vol. 42, p. 1362-69 (2006).

Frost; Raman Microprobe spectroscopy of halloysite. Clays and Clay Minerals, 1997, vol. 45, No. 1, 66-72.

Gao, F.; Clay/Polymer Composites: the story; MaterialsToday Nov. 2004; pp. 50-55.

Gay et al.; C. Gay, L. Liebler; Theory of Tackiness; Physical Review Letters, 82 (5) 936-9 (1998).

Gilman et al.; J.W. Gilman, C.L. Jackson, A.B. Morgan, R. Harris, E. Manias, E.P. Giannelis, M. Wuthenow, D. Hilton and S.H. Philips; Flammability properties of polymer-silicate nanocomposites; Chem. Mater.,12: 1866-1873 (2000).

Gregoriou, V.G.; Kandilioti, G.; Bolas, S.T.; Chain conformational transformations in sydiotactic polypropylene/layered silicate nanocomposites during mechanical elongation and thermal treatment; Polymer 46 (2005); 11340-50.

Harrison et al.; Dehydration of Fully Hydrated Halloysite from Lawrence County, IndianaClays and Clay Minerals; vol. 9: Issue 1: 374-377, (1960).

Howlin et al.; Modelling of Interaction at the Composite Interface Between Aluminosilicate Nanotubes and Polymer Matrices; Book of Abstracts, 218the ACS National Meeting, New Orleans, Aug. 22-26, 1999.

JP2000297179 Machine Translation JP2000297179; published Oct. 24, 2000; application JP11-105278 filed Apr. 13, 1999; Inventors/Applicants Henmi Akio et al.

Levis, S. et al.; Use of coated microtubular halloysite for the sustained release of diltiazem hydrochloride and propanolol hydrochloride; International Journal of Pharmaceutics; 253 (2003) 145-157.

Liu et al.; Properties of halloysite nanotube-epoxy resin hybrids and the interfacial reactions in the systems. Nanotechnology 2007, 18, 1-9.

Messersmith et al.; Messersmith, P. ;Giannelis, E.; Synthesis and Barrier Propeties of Poly(e-Caprolactone)-Layers Silicate Nanocomposites; J. Polym. Sci., Part A, Polym. Chem., 33, 1049 (1995).

Osman et al.; M.A. Osman, M. Ploetze and U.W. Suter; Surface treatment of clay minerals; J. Mater. Chem., 13, 2359-2366 (2003).

Price, R.In-Vitro Release Characteristics of Tetracycline HCl, khellin and Nicotinamide Adenine Dineculeotide from Halloysite; a Cylindrical Mineral, by R. Price et al., published in Journ. Microencapsulation, 2001, vol. 18, No. 6, p. 713-722.

Si et al.; M. Si; V. Zaitsev; M. Goldman; A. Frenkel; D.G. Peiffer; E.; J.C. Sokolov; M.H. Rafailovich; Self-extinguishing polymer/organoclay nanocomposites; Polymer Degradation and Stability, 92, 86-93 (2007).

Vanesch; G.J. vanEsch; World Health Organization; Flame Retardants: A General Introduction, Environmental Health Criteria 192, (1997).

Wagner et al.; Natural nanotubes enhance biodegradable and biocompatible nanocompsites. Industrial Biotechnology. 2005. pp. 190-193.

Wang et al.; Waterborne, Nanocomposite Pressure-Sensitive Adhesives with High Tack Energy, Optical Transparency, and Electrical Conductivity; Advanced Materials 2006, 18, 2730-2734.

Wang, X.; Li,Y.; Solution-based routes to transition-metal oxide one-dimensional nanostructures; Department of Chemistry, Tsinghua University, Beijing 100084, China; Pure Appl. Chem., vol. 78, No. 1, pp. 45-64, 2006; doi:10.1351/pac200678010045; c. 2006 IUPAC; pp. 1-20.

Ye et al.; High impact strength epoxy nanocomposites with natural nanotubes. Polymer, 2007, 48, 6426-6433.

Zanetti et al.;M. Zanetti, T. Kashiwagi, L.Falqui, G. Camino; Cone Calorimeter Combustion and Gasification Studies of Polymer Layered Silicate Nanocomposites; Chem. Mater., 14: 881-887 (2002).

Zanetti et al: M. Zanetti, G. Camino, C. Canavese, A.B. Morgan, F.G. Lamelas, C.A. Wilkie; Fire Retardant Halogen-Antimony-Clay Synergism in Polypropylene Layered Silicate Nanocomposites; Chem. Mater., 14. 189-193 (2002).

* cited by examiner

POLYMERIC COMPOSITE INCLUDING NANOPARTICLE FILLER

This application is a Divisional application of co-pending U.S. patent application Ser. No. 11/469,128 for "Polymeric Composite Including Nanoparticle Filler" filed Aug. 31, 2006, (published as US-2007-0106006-A1) that claims priority from U.S. Provisional Application 60/713,362 for a "Polymeric Composite Comprising Halloysite," filed Sep. 2, 2005 by S. Cooper, and from U.S. Provisional Application 60/728,939 for "Agricultural Applications for Halloysite Controlled Release," filed Oct. 22, 2005 by Michael L. Weiner et al., all of which are hereby incorporated by reference in their entirety.

The present invention relates to a novel polymeric composite including a nanoparticle filler. More particularly, the present invention provides a novel halloysite nanoparticle filler which has the general shape of a cylinder or rolled scroll-like shape, in which the diameter of the cylinder is less than about 500 nm, and a polymer composite, containing the halloysite nanoparticle, in which the advantages of the nanoparticle filler are provided (e.g., reinforcement, flame retardant, etc.) with improved or equivalent mechanical performance of the composite (e.g., strength and ductility).

BACKGROUND AND SUMMARY

From fiberglass to plywood, composite materials have become quite common in man-made materials for construction, fabrication and the like. A polymer composite includes at least one polymer matrix or material in combination with at least one particulate filler material. The polymer matrix material may be any of a number of polymers including themoplastics such as polyamide (Nylon), poly-urethane, polyolefins, vinyl polymers, and the like, thermosets, and elastomers. Some of the most common nanoparticle fillers are two-dimensional nanoclays, one-dimensional carbon nanotubes, and zero-dimensional metal oxide nanoparticles such as Zinc Oxide (ZnO), Titanium Dioxide (Ti02), and Zirconia (ZrO). Today, composite materials can be found in various products such as automobiles, building materials, food packaging and textiles. Composites offer the potential of materials having properties that are not often available in naturally occurring raw materials. Whether an ultra-lightweight material is needed with the strength to reinforce structural components or a transparent flame retardant material, (e.g., U.S. Pat. No. 6,518,324 to Kresta et al. for a Polymer Foam Containing Nanoclay), such characteristics are often the result of a composite material.

Traditional polymer composites have several potential limitations. First, the amount of filler required to impart the desired property enhancement is often significant—possibly in the range of about 30-60% by weight (weight percent). This creates several problems, including the potential for a composite that is heavier than the base polymeric material. It is sometimes the case that the expense of a large quantity of filler adds significant material cost to the final product, with the possibility of surpassing an economic threshold. In addition, blending, or pre-compounding, of the polymer with high levels of fillers may be necessary prior to forming the final product, adding an additional step and additional cost. Perhaps more importantly, the addition of fillers may also result in deleterious effects on the ductility or strength of the composite and thereby compromising the mechanical characteristics of the composite. One such phenomena is embrittlement, which occurs when any agglomeration or defect in the uniform dispersion of the filler particles creates an inhomogeneity and causes a weak point in the composite.

Second, the interaction between the filler and the matrix is critical to the properties of any composite. A filler particle can have several effects on the surrounding polymer matrix. If there is strong adhesion between the particle and the polymer, the polymer strength and modulus are typically increased, often at the expense of elongation. If the adhesion between the filler and the polymer is weak, the polymer strength may actually decrease, resulting in elastomeric-like properties, as described, for example, by Benjamin J. Ash et al., in "Investigation into the Thermal and Mechanical Behavior of PMMA/Alumina Nanocomposites," Materials Research Society Symposium Proceedings, Vol. 661, p. KK2 10.1-6 (2001), which is hereby incorporated by reference in its entirety.

Third, effective filler materials often increase the potential environmental impacts of composite products, for example, further increasing lifecycles of plastics, including those disposed of in landfills and, depending on the nature of the filler, potentially increasing harmful effluent leakage into local resources (e.g., the chromate fillers used in anti-corrosion coatings). In summary, the material tradeoffs are often prohibitive or less than ideal for utilization of known composites.

One particular class of composite has demonstrated great promise in overcoming the limitations and tradeoffs noted above—polymer nanocomposites. Nanocomposites generally include one or several types of nano-scale particles dispersed within a polymer matrix. The benefits of nanoparticles are derived from the very large surface area interactions of the nanoparticles with the polymer matrix. The nature of this interaction allows for beneficial property improvements, sometimes using fillers at very low loading levels, often as low as about 1 to 10 weight percent. The possibility of using lower loading levels reduces the concerns relative to increased waste and increased costs. The lower loading levels also increases the potential for homogeneous dispersion of the filler within the composite matrix. One exciting advance observed with nanocomposite research has been the ability to combine the properties of the polymeric matrix with those of the nanoparticle filler with little to no trade-offs—so that the nanocomposite may be both strong and ductile. The implications of this discovery extend the possibility of creating multifunctional composites, which may exhibit improved strength, ductility, corrosion resistance, flame retardation, and optical transparency.

Nanocomposites are not exempt from traditional challenges of other well-known composites because the advancement of nanocomposites requires both matrix/filler compatibility and the effective dispersion of filler within the matrix. If either of these requirements is not achieved, the properties of the nanocomposite will likely suffer, even perhaps becoming less effective than the corresponding macro-composite or the polymeric matrix material. Therefore, much of the work surrounding nanocomposites is directed to attaining homogenous mixtures and finding ways to assure the filler is functionalized to interact with the matrix.

A significant portion of the nanocomposite materials on the market today are based upon nanoclay fillers. In general nanoclay fillers consist of laminar clays, some of which are naturally occurring (e.g., kaolin and smectite), and synthetic clays, (e.g., fluorohectorite and fluoromica). Each of the nanoclays is a layered silicate, held together by an intercalation layer—often water. The nanocomposite filler consists of "exfoliated" two-dimensional sheets of clay. In some embodiments, the individual layers are separated from one another and dispersed throughout a polymer matrix. The exfoliation, or separation, process is quite complex and often incomplete, thus frequently leaving larger pieces of clay that create weak points in the polymer matrix. Exfoliation generally involves first swelling the clay by introducing small interacting molecules or polymers into the intercalation space existing between the clay layers, to increase the distance between layers, and finally introducing a shear force or energy to complete the separation of the layers.

As silicates are naturally hydrophilic and many industrially important polymers are hydrophobic, the clay may also be modified or functionalized before mixing the two together while seeking to disperse the filler in the polymer matrix. Otherwise the filler and matrix will phase separate rather than form a homogeneous composite. Moreover, organic surface modifiers, used to increase the binding between filler and matrix often adversely affect the properties of the composite.

Exfoliation is generally accomplished using one of three processes. One process is melt intercalation of the polymer into an organically modified silicate. Although this process works well with more polar polymers such as polysiloxanes and polyethers, less polar polymers such as polypropylene, requires a modifier, such as maleic anhydride, often in the form of a maleic anhydride-polypropylene copolymer, to compatibilize the nanocomposite. In addition, modification of the layered clay material may also be required. A second process is the formation of a layered silicate in an aqueous polymer solution. The development of this process will likely be limited to polymers that are soluble or dispersible in water. A third process that is receiving increasing attention involves a silicate that is intercalated by an initiator or catalyst, and upon introduction of a monomer an intercalated or exfoliated polymer nanocomposite is formed. See, for example, Bergman, J. S., Chen, H., Giannelis, E., Thomas, M., Coates, G., Chem. Comm. (1999) 2179-2180, which is hereby incorporated by reference in its entirety.

Exfoliation can be quite challenging and expensive, due to the addition of the extra processing step(s). Often, even the best processes do not fully exfoliate the clay samples, but rather only the outermost or top several layers. In such situations, un-exfoliated clay samples may become incorporated into the nanocomposite, causing inhomogeneity and weak points throughout the polymer composite matrix. The exfoliation challenge leads to difficulty in obtaining a homogeneous dispersion, thereby producing a polymer composite with particles that tend to re-agglomerate and resist separation.

The present disclosure addresses these weaknesses in current nanoclay composites while providing additional functionality, or multifunctionality, to these composites that is not currently available with two-dimensional nanoclay composites. Disclosed embodiments include those directed to polymeric composites including nanoclays, particularly those utilizing mineral nanotubes, and a method for preparing such composites. The advantages are at least two-fold and include ease of processing (no need for exfoliation) as well as a geometry that provides acceptable binding of the tube to the polymer matrix. Furthermore, the use of the nanotubes provides additional functionality via the inner open space or cavity of the tube, particularly the ability to incorporate active chemical agents within the tubes, or to coat the tube surfaces.

Disclosed in embodiments herein is a polymeric nanoparticle composite, comprising: a polymer matrix; and a filler consisting essentially of mineral nanotubes.

Also disclosed in embodiments herein is a method for making a polymer composite, including: producing an air milled treated halloysite having a nanotubular structure; and combining a polymer material with said surface treated halloysite to form the polymer composite.

Further disclosed in embodiments herein is a polymer composition including about 1 to about 10 weight-percent of a nanotubular clay filler dispersed therein, based on the total weight of polymer, said nanoclay filler including nanotubes having an outer cylindrical diameter of less than about 500 nm and a length of less than about 40,000 nm (40 um).

Further disclosed in embodiments herein is a method for producing a polymer composite part, including: obtaining a tubular clay filler material; surface modifying the tubular clay filler material; air milling the surface treated material; drying the material; combining the dried material with a polymer to form a composite mixture; and forming the composite mixture into the part.

The various embodiments described herein are not intended to limit the invention to those embodiments described. On the contrary, the intent is to cover all alternatives, modifications, and equivalents as may be included within the spirit and scope of the invention as defined by the appended claims.

DETAILED DESCRIPTION

A "platy clay" shall mean a layered inorganic clay material, such as a smectite or kaolin clay, this is in the form of a plurality of adjacent bound layers.

As used herein the term "halloysite" is a naturally occurring clay of the chemical formula $Al_2Si_2O_5(OH)_4 \cdot nH_2O$; material that is believed to be the result of hydrothermal alteration or surface weathering of aluminosilicate minerals, such as feldspars. Halloysite in its hydrated form may also be referred to as endellite. Halloysite further includes tubular nanoparticles therein (halloysite nanotubes (HNT)).

A "nanoparticle composite" or "nanocomposite" for short, is intended to include a composite material wherein at least one component comprises an inorganic phase, such as a halloysite material, with at least one dimension of the inorganic component is in the range of about 0.1 to 500 nanometers.

As more particularly set forth below, the disclosed materials and methods are directed to polymeric composites, and nanoclay nanocomposites, particularly those utilizing one-dimensional mineral nanotubes, and a method for preparing such composites. The advantages of such composites are at least two-fold. First is the ease of processing. A nanotubular filler eliminates the need for exfoliation as required by other two-dimensional nanoclay fillers. The nanotubes are discrete nanoparticles and therefore need no additional chemical exfoliation to provide the desired dispersion. Furthermore, the tubular geometry provides a mechanism for increasing the binding of the tube to the matrix with minimum required surface modification of the clay nanotube. The polymer matrix may also be made to traverse the inner open space or cavity of the tube structure, thereby increasing the interaction and bonding between the nanofiller and the polymeric matrix.

The second advantage arises from the additional functionality that is possible with a tubular geometry as opposed to a laminar structure. This functionality is enabled by the inner open space or cavity of the tube, particularly the ability to fill the tubes with active agents, or to coat the tube surfaces with metal or metal oxides. Advantages may also arise simply by virtue of the selective chemistry which occurs in certain tubes, where the inner surfaces have different reactivities than the outer surfaces.

Figure 1:
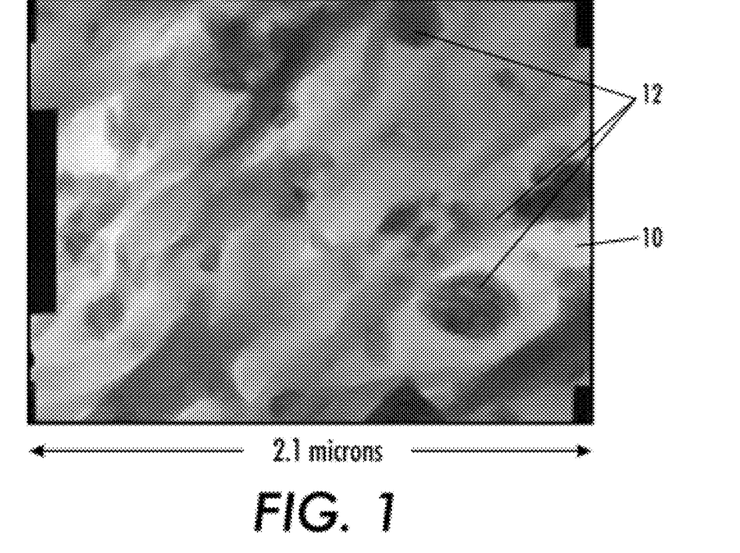
FIG. 1 is a photomicrograph of an exemplary composite material employing halloysite clay nanotubes in accordance with an aspect of the disclosed embodiments.

In accordance with an embodiment of the invention, one such mineral nanotube that is naturally occurring is the halloysite nanotube. Referring, for example, to FIG. 1, there is depicted a photomicrograph of a polymeric nanoparticle composite, comprising a polymer matrix 10 and a filler including halloysite nanoparticles 12. As described below, the halloysite nanoparticles have a generally cylindrical or scroll-like shape that is believed to be formed during weathering of the native hydrated clay, where the aluminosilicate forms a bilayer structure of distinct alumina and silica layers. The clay consists of subsequent bilayers held together by an intercalated water layer. One of the consequences of this bilayer structure is that the alumina layer and the silica layer differ in lattice structure—alumina being octahedrally bonded and silica being tetrahedrally bonded—where the lattice differences cause otherwise planar sheets of halloysite to curl and eventually self form a scroll-like tube. More specifically, tetrahedral bonding results in a less constrained structure (i.e. greater degrees of freedom).

Silica and alumina differ in their respective reactivities, which further leads to potentially useful characteristics of halloysite tubes not seen in either two-dimensional nanoclays or most other nanotubes. For example, at a pH of less than about 6, the alumina terminated ends of the tube become positively charged, while the silica surfaces remain negatively charged to a pH of about 2; in other words the silica walls act as a polyvalent anion, while the ends of the tubes are amphoteric. Differential surface charges below a pH of about 6 result in a self-organizing network of tubes generally arranged end to wall, at least on a localized level. Differential surface charges also open up an opportunity to do selective chemistry to confine or organize chemical agents within one area of the tube.

Halloysite nanotubes typically range in length from about 100 nm to 40,000 nm (40 microns), with an average (dependent on the natural source) of about 1,200 nm. In one embodiment, the nanocomposite material includes halloysite nanoparticles having a mean average cylindrical length of at least about 100 nm to about 40,000 nm, and typically on the order of about 1,200 nm. Inner diameters of untreated nanotubes range up to about 200 nm with an average of approximately 40 nm, while outer diameters range from about 10 nm to 500 nm with an average of about 200 nm. In one embodiment, the nanocomposite material includes halloysite nanoparticles having a mean average outer cylindrical diameter of less than about 500 nm, and preferably on the order of about 200 nm. It may also be possible to characterize the nanotubes using a relationship between certain dimensions, e.g., an aspect ratio (length/diameter). In one embodiment it is believed that halloysite nanotubes may exhibit a length/diameter ratio of between about 0.2 to about 40,000, with an average aspect ratio of about 6.

Native halloysite is a hydrated clay with an intercalated water layer giving a basal spacing of about 10 Å. Subsequent drying of the clay can lead to the dehydrated form of the clay where the intercalated water has been driven off and the basal spacing reduced to 7 Å. Hydrated and dehydrated halloysite can be distinguished through X-ray diffraction. Dehydration is a naturally irreversible process, though researchers have had some success with artificially rehydrating the tubes with a potassium acetate treatment. In the hydrated form the intercalated water can be substituted out for small cations including organics such as glycerol.

Halloysite is a useful constituent of many polymeric composites for the purpose of mechanical and thermal property improvement, including those where the polymer is a coating (e.g., polyurethane), a film, a molded part, fiber, foam, etc., or in a composite where the polymer is a copolymer or terpolymer. Nanocomposites including halloysite nanotubes may also be used in embodiments where the filler is surface modified, including where the filler is coated for functionality (e.g., metal coating). In such an embodiment, the coated HNT filler may be used for conductive coatings and shielding, for example. HNT's, for example, may be included in composites as flame retardant materials. As described by M. Du et al. in "Thermal Stability and Flame Retardant Effects of Halloysite Nanotubes on Poly(propylene)," published in the European Polymer Journal, Vol. 42, p. 1362-69 (2006), incorporated herein by reference in its entirety, halloysite materials may also be used as flame retardants.

Alternatively, as described herein the filler may also be filled with an agent for elution (e.g. minerals, light emitting substances such as fluorescent or phosphorescent substances, colorants, antioxidants, emulsifiers, biocides, antifungal agents, pesticides, fragrances, dyes, optical brighteners, fire retardants, self-healing polymers, or mixtures and combinations thereof etc.), as described, for example, in U.S. Pat. No. 5,651,976 by Price et al., which is incorporated herein by reference in its entirety. Also contemplated is an embodiment where the composite filler, for example, HNT, is in turn filled with one or more materials such as colorants, antioxidants, emulsifiers, biocides, antifungal agents, pesticides, fragrances, dyes, optical brighteners, fire retardants, self-healing polymers and plasticizers, or where multiple fillers act in parallel to provide a plurality of properties or advantages including mechanical properties, whiteness, temperature resistance, etc.

Although described herein with respect to a particular nanotubular mineral fillers, such as halloysite, it will be appreciated that various alternative materials may also be employed. Other inorganic materials that will, under appropriate conditions, form tubes and other microstructures, include imogolite, cylindrite and boulangerite. Cylindrite and boulangerite also belong to the class of minerals known as sulfosalts.

The surface of halloysite or other tubular clay materials may be modified to impart compatibility with the polymer binder, as described in U.S. Pat. No. 6,475,696, which is hereby incorporated by reference in its entirety. Compatibility is enhanced through either similar cohesive energy density or bonding capacity of the polymer and filler or other specific interactions, such as ionic or acid/base interactions.

The nature of the specific compatibilization agents will vary widely depending on the particular polymer and the particular filler material. These compatibilization agents can be organic compounds, which are neutral or ionic. Useful neutral organic molecules may include polar molecules such as amides, esters, lactams, nitriles, ureas, carbonates, phosphates, phosphonates, sulfates, sulfonates, nitro compounds, and the like. Preferred neutrals organics can be monomeric, oligomeric, or polymeric. Useful ionic compounds may include cationic surfactants including onium species such as ammonium (primary, secondary, tertiary, and quaternary), phosphonium, or sulfonium derivatives of aliphatic, aromatic or arylaliphatic amines, phosphines, and sulfides, which ion exchange with the metal cations of the preferred halloysite nanotube material.

Another class of useful compatibilization agents may include those that are covalently bonded to the layers of the inorganic nanotubes such as halloysite. Illustrative of such groups that may be useful in the practice of this invention are organosilane, organozirconate, and organotitanate coupling agents. Silanes can function as compatibilizing agents that are highly specific to a selected polymer system. In some embodiments of the invention, the compatibilizing agent will include a moiety which bonds to the surface of the material and will not be reactive with the polymer. The agent may also include a moiety, which may not bond with the nanotube material, but is compatible with the polymer.

Examples of various types of compatibilizing agents that may be useful for treating clays and other inorganic materials having nanotubular structures are included in, but not limited to, the disclosures of U.S. Pat. Nos. 4,894,411; 5,514,734; 5,747,560; 5,780,376; 6,036,765; and 5,952,093, which are hereby incorporated by reference in their entirety for their teachings.

Treatment of a halloysite nanotube clay by the appropriate compatibilizing agents can be accomplished by any known method, such as those discussed in U.S. Pat. Nos. 4,889,885; 5,385,776; 5,747,560; and 6,034,163, which are also hereby incorporated by reference in their entirety. The amount of compatibilizing agent can also vary substantially provided the amount is effective to compatibilize the nanotubes to obtain a desired substantially uniform dispersion. This amount can vary from about 10 millimole/100 g of material to about 1000 millimole/100 g of material.

Similarly, polymeric materials may effectively compatibilize polymer-HNT systems. Specifically, copolymers are often used, in which one type of monomer unit interacts with the HNT's, while the other monomer units interacts with the polymer. For example, polypropylene-maleic anhydride copolymer may be added to a polypropylene-HNT nanocomposite to provide compatibilization of the system. The polypropylene segments are miscible with the polypropylene homopolymer, while the anhydride segments interact with HNT surface, thus improving the homogeneity of the resulting nanocomposite.

As noted above, the halloysite or other inorganic nanotubes may be employed as fillers in nancomposite materials using any polymers as the binder, including thermoplastics, thermosets, elastomers, and the like. Examples include polyethylene, polypropylene, polyvinyl chloride, polyurethane, acrylic-based polymers, polyester, polystyrene, fluoropolymers, and polyamide (e.g. Nylon) or similar materials generally characterized as thermoplastics. Thermoplastic elastomers vary widely and can include, but are not limited to, polyurethane elastomers, fluoroelastomers, natural rubber, poly(butadiene), ethylene-propylene polymers, and the like. Various polymers may also be utilized, including, but not limited to various matrix thermoplastic resins including polylactones such as poly(pivalolactone), poly(caprolactone), and the like, polyurethanes derived from reaction of diisocyanates such as 1,5-naphthalene diisocyanate, p-phenylene diisocyanate, m-phenylene diisocyanate, 2,4-toluene diisocyanate, 4,4'-diphenylmethane diisocyanate, 3,3'-dimethyl-4,4'diphenyl-methane diisocyanate, 3,3-'dimethyl-4,4'-biphenyl diisocyanate, 4,4'-diphenylisopropylidene diisocyanate, 3,3'-dimethyl-4,4'-diphenyl diisocyanate, 3,3'-dimethyl-4,4'-diphenylmethane diisocyanate, 3,3'-dimethoxy-4,4'-biphenyl diisocyanate, dianisidine diisocyanate, tolidine diisocyanate, hexamethylene diisocyanate, 4,4'-diisocyanatodiphenylmethane and the like; and linear long-chain diols such as poly(tetramethylene adipate), poly(ethylene adipate), poly(1,4-butylene adipate), poly(ethylene succinate), poly(2,3-butylenesuccinate), polyether diols and the like; polycarbonates such as poly(methane bis(4-phenyl)carbonate), poly(1,1-ether bis(4-phenyl)carbonate), poly(diphenylmethane bis(4-phenyl)carbonate), poly(1,1-cyclohexane bis(4-phenyl)carbonate), poly(2,2-bis-(4-hydroxyphenyl)propane) carbonate, and the like; polysulfones, polyether ether ketones; polyamides such as poly (4-amino butyric acid), poly(hexamethylene adipamide), poly(6-aminohexanoic acid), poly(m-xylylene adipamide), poly(p-xylyene sebacamide), poly(2,2,2-trimethyl hexamethylene terephthalamide), poly(metaphenylene isophthalamide) (Nomex), poly (p-phenylene terephthalamide) (Kevlar), and the like; polyesters such as poly(ethylene azelate), poly(ethylene-1,5-naphthalate), poly(ethylene-2,6-naphthalate), poly(1,4-cyclohexane dimethylene terephthalate), poly(ethylene oxybenzoate) (A-Tell), poly(para-hydroxy benzoate) (Ekonol), poly(1,4-cyclohexylidene dimethylene terephthalate) (Kodel) (cis), poly(1,4-cyclohexylidene dimethylene terephthalate) (Kodel) (trans), polyethylene terephthlate, polybutylene terephthalate and the like; poly(arylene oxides) such as poly(2,6-dimethyl-1,4-phenylene oxide), poly(2,6-diphenyl-1,4-phenylene oxide) and the like poly(arylene sulfides) such as poly(phenylene sulfide) and the like; polyetherimides; vinyl polymers and their copolymers such as polyvinyl acetate, polyvinyl alcohol, polyvinyl chloride, polyvinyl butyral, polyvinylidene chloride, ethylene-vinyl acetate copolymers, and the like; polyacrylics, polyacrylate and their copolymers such as polyethyl acrylate, poly(n-butyl acrylate), polymethylmethacrylate, polyethyl methacrylate, poly(n-butyl methacrylate), poly(n-propyl methacrylate), polyacrylamide, polyacrylonitrile, polyacrylic acid, ethylene-acrylic acid copolymers, ethylene-vinyl alcohol copolymers acrylonitrile copolymers, methyl methacrylate-styrene copolymers, ethylene-ethyl acrylate copolymers, methacrylated budadiene-styrene copolymers and the like; polyolefins such as (linear) low and high density poly(ethylene), poly(propylene), chlorinated low density poly(ethylene), poly(4-methyl-1-pentene), poly(ethylene), poly(styrene), and the like; ionomers; poly(epichlorohydrins); poly(urethane) such as the polymerization product of diols such as glycerin, trimethylol-propane, 1,2,6-hexanetriol, sorbitol, pentaerythritol, polyether polyols, polyester polyols and the like with a polyisocyanate such as 2,4-tolylene diisocyanate, 2,6-tolylene diisocyante, 4,4'-diphenylmethane diisocyanate, 1,6-hexamethylene diisocyanate, 4,4'-dicycohexylmethane diisocyanate and the like; and polysulfones such as the reaction product of the sodium salt of 2,2-bis(4-hydroxyphenyl) propane and 4,4'-dichlorodiphenyl sulfone; furan resins such as poly(furan); cellulose ester plastics such as cellulose acetate, cellulose acetate butyrate, cellulose propionate and the like; silicones such as poly(dimethyl siloxane), poly(dimethyl siloxane), poly(dimethyl siloxane co-phenylmethyl siloxane), and the like, protein plastics, polyethers; polyimides; polyvinylidene halides; polycarbonates; polyphenylenesulfides; polytetrafluoroethylene; polyacetals; polysulfonates; polyester ionomers; and polyolefin ionomers. Copolymers and/or mixtures of these aforementioned polymers can also be used.

Thermosetting polymers may also be utilized, including, but not limited to various general types including epoxies, polyesters, epoxy-polyester hybrids, phenolics (e.g., Bakelite and other phenol-formaldehyde resins), melamines, silicones, acrylic polymers and urethanes. Preferably, thermosetting polymers could be formed in-situ, through introduction of monomers, followed by curing utilizing heat, ultraviolet radiation, or the like.

Polypropylene nanocomposites have been formed using maleic anhydride modified polypropylene copolymers, as will be discussed in detail below relative to some of the examples.

It will be further appreciated that various manufacturing methodologies or techniques can be employed in the formation of materials or goods incorporating the nanocomposite materials described herein. These manufacturing process include, but are not limited to, coating, molding (e.g., compression, transfer, injection, blow, extrusion, expandable-bead, foam (see e.g., U.S. Pat. No. 5,855,818, hereby incorporated by reference), compounding, extrusion (including extruded and oriented to form film or fibers), co-extrusion (see e.g., U.S. Pat. No. 6,958,860, hereby incorporated by reference in its entirety), rotomolding, thermoforming, vacuum forming, calendaring, matched-die molding, hand lay-up, filament winding, casting, and forging.

The practice of one or more aspects of the invention are illustrated in more detail in the following non-limiting examples in which Nylon-6- and polypropylene-based nanocomposite materials were produced, using a halloysite nanotubular filler, and tested. The halloysite nanocomposite material was produced for testing and comparison against a non-composite (Nylon-6) and a composite prepared using a platy clay (e.g., Cloisite®) filler. Cloisite® 30B is a natural montmorillonite modified with a quaternary ammonium salt, from Southern Clay Products (subsidiary of Rockwood Specialties, Inc.)

EXAMPLE 1

Figure 2:
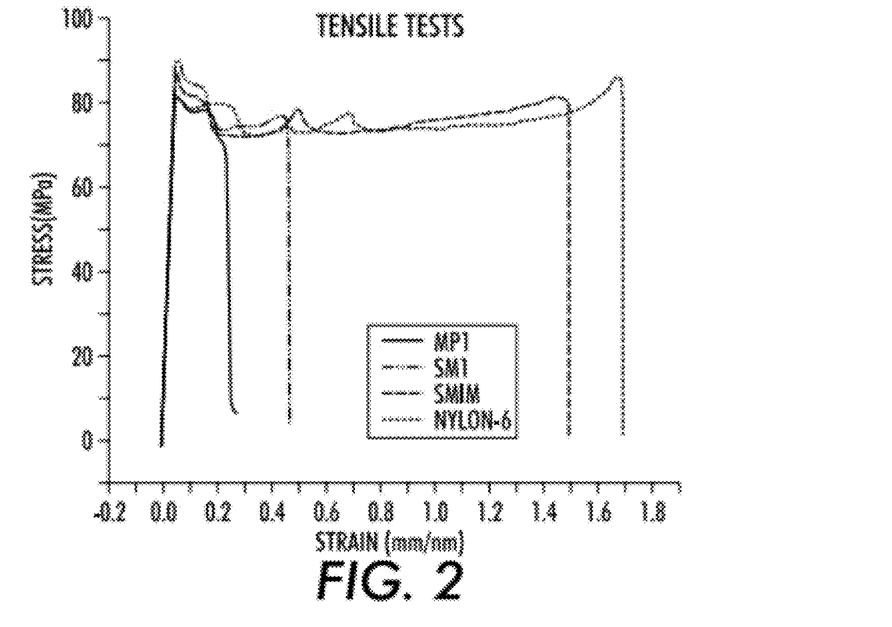
FIG. 2 is a graphical illustration of tensile testing results obtained in accordance with the non-limiting experiments described relative to Example 1.

Halloysite MP-SM1, was obtained from Imerys New Zealand China Clays, which was treated by first surface modifying the material with about 0.5 to 1% benzalkonium chloride, although about 0.1 to about 2.0% may be acceptable. Treatment was followed by air milling (also known as jet milling) the surface treated halloysite (SM1M) to break-up the halloysite particles and assure dispersion thereof in the composite. All materials were dried under vacuum for 16 hours. Nylon-6 was ground in a Retsch model ZM100 grinder and combined with 5% halloysite in a Hauschild model DAC 150 FV speed mixer. The blended powder was extruded at 250° C. using a DSM Twin-Screw microcompounder under flowing nitrogen using a screw speed of 100 rpm. The composites were injection molded at 250° C. to obtain samples for mechanical testing. Instron mechanical testing was conducted per ASTM standard D638 using type IV specimen dimensions and an Instron crosshead speed of 5 mm/min. Mechanical test results are illustrated in FIG. 2 and presented in TABLE A.

TABLE A

| Composite | Modulus (GPa) | Yield Strength (MPa) | Elongation (%) |
| --- | --- | --- | --- |
| Neat Nylon | 1.5 | 81 | 1.7 |
| Nylon/5% untreated HNT (MP1) | 1.9 | 83 | 0.23 |
| Nylon/5% treated HNT (SM1M) | 2.3 | 87 | 1.51 |
| Nylon/5% platy clay (Nylon-6) | 2.5 | 87 | 1.51 |

COMPARATIVE EXAMPLE 1

Nylon-6 was extruded with platy clay (e.g., Cloisite®; Cloisite® 30B is a natural montmorillonite modified with a quaternary ammonium salt, from Southern Clay Products, subsidiary of Rockwood Specialties, Inc.), instead of halloysite, using methods similar to those described above relative to the preparation of the halloysite material. Mechanical test results are illustrated in FIG. 2 and presented in TABLE A.

As will be appreciated from the data in TABLE A, the addition of the halloysite material results in a nanocomposite that exhibits a modulus of elasticity and a yield strength greater than that of the polymer matrix without filler, without a significant sacrifice in elongation. More importantly, the modulus, yield strength, and elongation of Example 1 is comparable to that of the platy clay of comparative Example 1, showing that halloysite clay composites can achieve mechanical properties comparable to the best platy clay composites, without the added cost of exfoliation.

The amount of nanotubular clay filler dispersed in the polymer composition, based on the total weight of polymer, is believed to be preferably between about 1 and 20 percent, and more preferably between about 3 percent and about 10 percent and, as indicated in the embodiment described above, about 5 percent—the nanoclay filler including halloysite or similar mineral nanotubes having an outer cylindrical diameter of less than about 500 nm and a length of less than about 40,000 nm (40 um).

As a result of the testing set forth in Example 1 and Comparative Example 1, it is clear that the introduction of between about 1 to about 20 weight-percent, or about 3 to about 7 weight-percent, and perhaps more preferably about 5 weight-percent of a filler consisting essentially of treated halloysite clay nanotubes produces an increase in the modulus and tensile strength of the nanocomposite material, without sacrificing ductility. Moreover, the properties are at least as good as a similar platy clay nanocomposite, albeit avoiding the added complexity and cost of preparing the platy clay filler material (i.e., avoiding exfoliation processing).

Although the examples set forth above describe actual processing temperatures for the samples prepared, it will be appreciated that processing temperature may vary not only for the material being used, but also with respect to the properties desired in the finished composite material. Accordingly, it is believed that temperatures in the range of about 5° C. to about 100° C., or more, above the melting point of the material may be employed in either the microcompounding and/or molding steps set forth above.

EXAMPLE 2

In a second set of tests, various combinations of refined, treated halloysite (Ref. SM1M), polypropylene (e.g., SABIC; 86MF10; Mw>400,000) and maleic anhydride-graft-polypropylene copolymer (MA-g-PP) (Eastman Chemical Epolene43 (Maleic Anhydride 4.2 wt %); Mx>10,000) were produced using a DSM twin screw microcompounder (200° C./Time: 5 min.) and then micro injection molded at a temperature of about 200° C. (typically in the range of about 0° C. to about 100° C. above melting point) The resulting samples were subsequently tested both mechanically and for thermal decomposition.

As a result of the testing, it was observed that an increase in decomposition temperature for the PP/HNT composites occurred, while the mechanical properties of the composite were similar to the unfilled material. More specifically, in a polypropylene nanocomposite material, the addition of about 5 weight-percent halloysite nanotubular filler resulted in an increase in decomposition temperature from 390° C. to 412° C., where the decomposition temperature is defined as the temperature at which a 1.5% weight loss has occurred. In another polypropylene nanocomposite (PP/PP-g-MA (14/1)), the addition of about 5 weight-percent halloysite nanotubular filler resulted in an increase in decomposition temperature from 370° C. to 420° C. Based upon the results of these experiments, where significant changes are observed without specific functionalization of the halloysite nanotubular filler, it is believed that even greater property improvements are possible using halloysite nanotubular filler where the nanotubes have been surface treated specifically for the purpose of interaction with the polypropylene polymer.

In embodiments of the present invention it is further contemplated that the halloysite or other inorganic tubular materials may be treated and/or may include one or more active agents (coated thereon or encapsulated or otherwise present within the interior of the tubular structure). With respect to the treatment, or more particularly surface treatment, it is contemplated that halloysite nanotubes, for example, may be treated using one of the compatibilization agents disclosed herein (e.g. silanes). As noted with respect to the results of Example 1, the compatibilization agents are anticipated to provide even greater improvements in the mechanical properties of the nanocomposites in which they are employed. An alternative group of agents, or active agents, are intended to provide a desired effect as a result of their use or delivery using the nanotubes.

Compositions of the invention may include one or more additives or active agents. Those skilled in the art will, with the benefit of this disclosure, recognize that a number of additives may be useful in an embodiment of the present invention. Additives may, for example, include one or more colorants, antioxidants, emulsifiers, biocides, antifungal agents, pesticides, fragrances, dyes, optical brighteners, fire retardants, self-healing polymers and plasticizers (e.g. as described in Provisional Application 60/728,939 previously incorporated by reference) or mixtures and combinations thereof. The amount of the additive necessary will vary based upon the type of additive and the desired effect.

The ratio of the active agent to inorganic (mineral-derived) nanotubular filler may be varied to provide differing levels of efficacy, release profile, and distribution. For example, the compositions may include an approximate ratio of active agent to nanotubular material (by weight) of between 1:1 and 5:1, however ratios in the range of about $1\times10^{-5}$:1 to about 10:1 may provide the desired effect.

In one contemplated embodiment, compositions of the invention may provide an active agent or a plurality of active agents in an extended release profile and/or a controlled release profile. For example, the active agent may provide the desired effect in the nanocomposite for weeks, months or even years. It is understood that the release rate may be a function of the solubility of the active agent in its carrier or the composite matrix and/or the mobility/diffusion thereof within the composite. For example, an adherent barrier coating may be employed for retarding or controlling the release rate. Moreover, it is contemplated that a plurality of active agents may be included in a combination of extended and controlled release profiles to achieve a single or perhaps multiple effects. In addition, compositions of the invention may be blended to enhance active agent properties.

In yet an additional embodiment, compositions and methods may also be employed to enable the distribution of one or more active agents, including the distribution of agents at one or more rates and/or at one or more times. The composition may include, for example, mineral-based nanotubular material having one or more active agents and additives. The active agents may be selected from the list of active agents set forth above, or other agents, and combinations thereof. In one example, it is contemplated that an inorganic nanotubular composition may be created to distribute one active agent at a first rate and a second active agent at a second rate, and more particularly, where the first rate is greater than the second rate. As will be appreciated, the foregoing embodiments are intended to be exemplary and are not intended to limit the various embodiments described herein or otherwise incorporating the inventive concepts disclosed.

An embodiment of the present invention may further include the method of encapsulating the active agent within the nanotubular structures of halloysite or similar inorganic materials. In the embodiment, as disclosed for example by Price at al. in U.S. Pat. No. 5,492,696, and hereby incorporated by reference in its entirety, the nanotubes are cylindrical microstructures and may have been pre-treated by metal cladding or coating using an electroless deposition process. Next, the nanotubes are air or freeze dried to provide hollow micro-capillary spaces. The micro-capillary spaces are subsequently filled by exposing the dried nanotubes to the active agent and its carrier or solvent, wherein the active agent is allowed to infiltrate (e.g., scattering spreading, injecting, etc.) Post processing of the filled nanotubes may include filtering or other processes to remove the active agent/carrier from the outer surfaces of the nanotubes, or to provide a secondary exposure to permit extended or controlled release of the active agent once the nanotube filler material has been used in the preparation of a nanocomposite material.

As suggested above, the embodiment contemplates the use of a post-infiltration coating that may act as a cap or plug to moderate the release of the active agent. In other words, the polymer composition may further include an adherent barrier coating applied to the nanotubes, for controlling the release of the active agent from the nanotubes. This and other techniques are also disclosed, for example, by Price et al. in U.S. Pat. No. 5,651,976, which is hereby incorporated by reference in its entirety, and where a biodegradable polymeric carrier is encapsulated within the microcapillary space of the nanotube.

Other possible applications for the use of halloysite nanotubes in a nanocomposite include: fire retardant coatings; anti-corrosion coatings; self-cleaning surfaces; self-healing plastics; barrier coatings; optical coatings and paints; biodegradable plastics; anti-microbial plastics; high temperature plastics; high strength plastics with high ductility; and plastics for lightweight armor. In the foregoing embodiments, the halloysite may be used in crude or refined form. It is further contemplated that while various examples are set forth herein for thermoplastic materials, thermosetting materials and thermoresins may also find particular use with the halloysite nanotubular fillers described herein.

As used herein the term crude form halloysite refers to halloysite that is substantially unrefined (e.g., halloysite ore, with little or no further processing or refinement of the halloysite, per se). On the other hand, refined halloysite refers to processed halloysite where the nanotube content has been artificially increased by any of a number of processing and separation technologies. High nanotube content refined halloysite is particularly useful in the foregoing applications in view of its high strength to weight ratio (e.g., for structural reinforcement and for high loading capacity). As illustrated in the examples above, use of the halloysite nanotube clay as a filler in the nanocomposite material provides, at a minimum, improved resistance to thermal decomposition while maintaining or improving the mechanical properties of the composite as compared to the raw polymer.

Furthermore, the high surface area within the nanotubes permits slow and consistent dissolution or elution of materials loaded within the nanotube. This feature of the nanotube permits the fabrication of materials having surprising endurance and long life even under extremely harsh conditions (e.g., high temperature, high moisture, low and/or high pressure, high and/or low pH, etc.).

It will be appreciated that various of the above-disclosed embodiments and other features, applications and functions, or alternatives thereof, may be desirably combined into many other different systems or applications. Also, various presently unforeseen or unanticipated alternatives, modifications, variations or improvements therein may be subsequently made by those skilled in the art which are also intended to be encompassed by the following claims.

What is claimed is:

1. A polymeric nanoparticle composite, comprising:
   a polymer matrix; and
   a tubular clay filler consisting essentially of surface modified mineral nanotubes, wherein said mineral nanotubes include at least one compatibilization agent.

2. A polymeric nanoparticle composite, comprising:
   a polymer matrix; and
   a tubular clay filler consisting essentially of surface modified mineral nanotubes, wherein said mineral nanotubes are halloysite nanoparticles and where said nanoparticles include a metal cladding thereon.

3. A polymeric nanoparticle composite, comprising:
   a polymer matrix; and
   a tubular clay filler consisting essentially of surface modified mineral nanotubes, wherein said mineral nanotubes include at least one agent for elution.

4. A polymeric nanoparticle composite, comprising:
   a polymer matrix; and
   a tubular clay filler consisting essentially of surface modified mineral nanotubes, wherein an active agent is adsorbed onto an inner surface of the nanotubes.

5. The composite of claim 1, wherein the mineral nanotubes are halloysite nanoparticles.

6. The composite of claim 5, wherein said halloysite nanoparticles have a mean average outer diameter of less than about 500 nm and a mean average length of less than about 40,000 nm.

7. The composite of claim 1, wherein said polymer matrix includes a polyolefin.

8. The composite of claim 1, wherein said polymer matrix includes thermosetting material selected from the group consisting of:
   epoxies;
   epoxy-polyester hybrids;
   phenolics;
   melamines; and
   urethanes.

9. The composite of claim 1, wherein said polymer matrix includes a thermoplastic material selected from the group consisting of:
   polyesters;
   polyethylene;
   polypropylene;
   polyvinyl chloride;
   silicones;
   acrylic polymers;
   fluoropolymers;
   polyurethanes;
   polystyrene; and
   polyimide.

10. The composite of claim 1, wherein said polymer matrix includes an elastomeric material.

11. The composite of 1, wherein said compatibilization agent is an organic compound.

12. The composite of 11, wherein said organic compound is a neutral organic compound.

13. The composite of 1, wherein said organic compound is an ionic organic compound.

14. The composite of 12, wherein said neutral organic compound is selected from the group consisting of:
    monomers;
    oligomers; and
    polymers.

15. The composite of claim 14, where said polymer is a copolymer.

16. The composite of claim 1, wherein said compatibilizing agent includes silane.

17. The composite of claim 1, wherein said polymer matrix consists essentially of Nylon and where said composite exhibits a modulus of elasticity of at least about 1.9 GPa and a yield strength at least about 83 MPa.

18. The composite of claim 5, wherein said halloysite nanoparticles have a generally cylindrical shape and exhibit differential surface charges to form a localized network of tubes arranged generally end to wall.

19. The composite of claim 9 wherein the composite is a coating applied on a surface.

20. The composite of claim 3, wherein said agent for elution is selected from the group consisting of: biocides; minerals; light emitting substances; fluorescent substances; phosphorescent substances; colorants; antioxidants; emulsifiers; antifungal agents; pesticides; fragrances; dyes; optical brighteners; fire retardants; self-healing polymers; and combinations thereof.

21. The composite of claim 1, wherein the mineral nanotubes are selected from the group consisting of:
    imogolite;
    cylindrite; and
    boulangerite.

22. The polymer composition of claim 4, wherein said nanotubes further include an adherent barrier coating for controlling the release of the active agent from said nanotubes.

23. The composition of claim 1, wherein the compatibilization agent consists essentially of a quaternary ammonium compound.

24. The composition of claim 23, wherein said quaternary ammonium compound includes benzalkonium chloride.

* * * * *